B. JOST.
AUTOMOBILE EXTRACTOR.
APPLICATION FILED JULY 28, 1917.
1,263,425.
Patented Apr. 23, 1918.
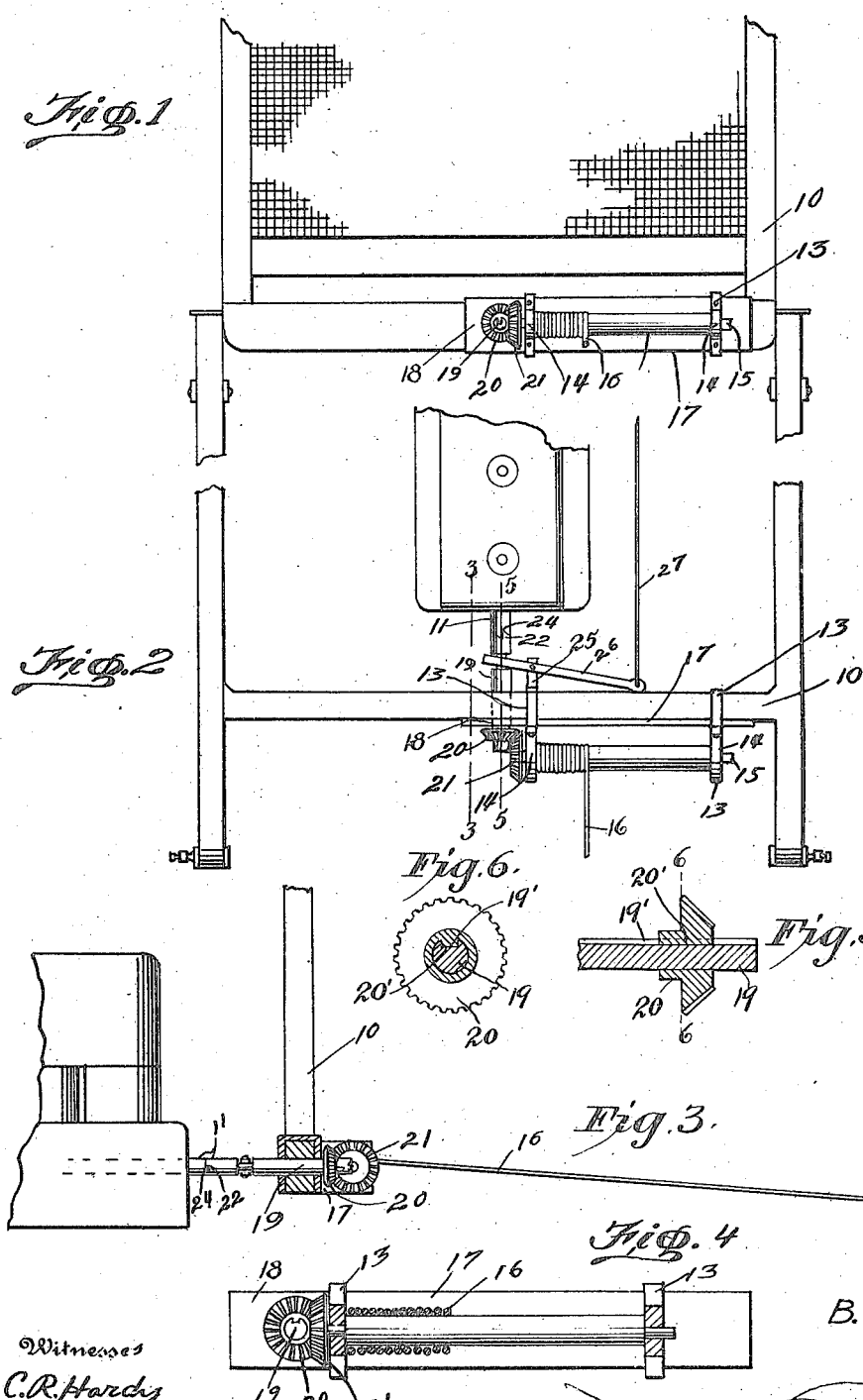
Inventor
B. Jost

UNITED STATES PATENT OFFICE.

BENEDICT JOST, OF SCENIC, SOUTH DAKOTA.

AUTOMOBILE-EXTRACTOR.

1,263,425.  Specification of Letters Patent.  Patented Apr. 23, 1918.

Application filed July 28, 1917.  Serial No. 183,273.

*To all whom it may concern:*

Be it known that I, BENEDICT JOST, a citizen of the United States, residing at Scenic, in the county of Pennington, State of South Dakota, have invented certain new and useful Improvements in Automobile-Extractors; and I do hereby declare the following to be a full, clear, and exact description of the invention, such as will enable others skilled in the art to which it appertains to make and use the same.

This invention relates to new and useful improvements in attachments for automobiles.

One object of the present invention is to provide a device which is adapted to be attached to the front of an automobile for the purpose of drawing the automobile out of muddy or sandy portions of the road or up a steep incline.

Another object is to provide a device of this character which is simple in construction, easy of operation, and which will pull the automobile out of its difficult position.

A further object is to provide a device of this character which is arranged to be driven by the engine of the automobile, but which will not interfere with the usual cranking of the engine.

Other objects and advantages will be apparent from the following description when taken in connection with the accompanying drawing.

In the drawing:

Figure 1 is a front elevation of a portion of an automobile showing my invention applied thereto.

Fig. 2 is a top plan view of the same.

Fig. 3 is a sectional view taken on the line 3—3 of Fig. 2.

Fig. 4 is a sectional view taken on the line 4—4 of Fig. 2.

Fig. 5 is an enlarged vertical longitudinal sectional view taken on the line 5—5 of Fig. 2.

Fig. 6 is a vertical sectional view taken on the line 6—6 of Fig. 5.

Referring particularly to the accompanying drawing 10 represents the front portion of the automobile, and 11 the engine shaft.

Detachably secured to the front of the frame of the automobile are the clamp members 13, each of which is formed with a forwardly extending bearing bracket 14, and supported in these brackets, and extending transversely of the automobile, is a shaft 15. Secured to this shaft, and arranged to be wound thereon, is a cable 16. The other end of this cable is adapted for attachment to a stake or tree, or other object ahead of the automobile. The clamps form an integral part of an elongated plate 17 which is disposed in front of and secured to the automobile. One end of the plate extends beyond the innermost clamp, and has thereon a bearing 18 through which is disposed a forwardly and rearwardly extending shaft 19. On the forward end of the shaft 19 there is mounted a bevel pinion 20 which meshes with a similar pinion 21 mounted on the adjacent end of the shaft 15. The inner end of the shaft 19 is formed with a clutch member 22 for engagement with a clutch member 24 on the forward end of the engine shaft 11. Extending rearwardly from the pinion end of the plate 17 is a bracket 25, and mounted for horizontal pivotal movement in this bracket, is a lever 26. One end of the said lever is operatively connected with the shaft 19, while the other end has connected thereto a rod 27 which extends rearwardly through the dashboard 12, where it is provided with a suitable handle (not shown). Upon grasping this handle and pulling the rod 27, the lever 26 will be rocked so that the shaft 19 will be moved forwardly and disengage its clutch from the clutch of the engine shaft. Upon pushing the rod forwardly the clutches will be engaged, and when the engine is running, the drum or shaft 15 will be rotated to wind the cable thereon and pull the automobile out of the difficult position, it being understood that the other end of the cable is first connected to a stake, tree, fence post, or other stationary object ahead of the automobile.

What is claimed is:

As an article of manufacture, a device for attachment to an automobile including a base plate having clamps at the ends thereof, brackets carried by the ends of the plate and extending in one direction from the plate, a bracket extending from the plate in the opposite direction, a cable carrying shaft mounted in one set of brackets, a shaft mounted in one end of the plate and operatively geared to the cable shaft, the last-named shaft being slidable through the gear carried thereby, and an operating lever mounted in the remaining bracket and operatively engaged with the slidable shaft.

In testimony whereof, I affix my signature in the presence of two witnesses.

BENEDICT JOST.

Witnesses:
HERMAN CLOSEMAN,
HERMAN O. MALLEY.

Copies of this patent may be obtained for five cents each, by addressing the "Commissioner of Patents, Washington, D. C."